Patented Oct. 17, 1939

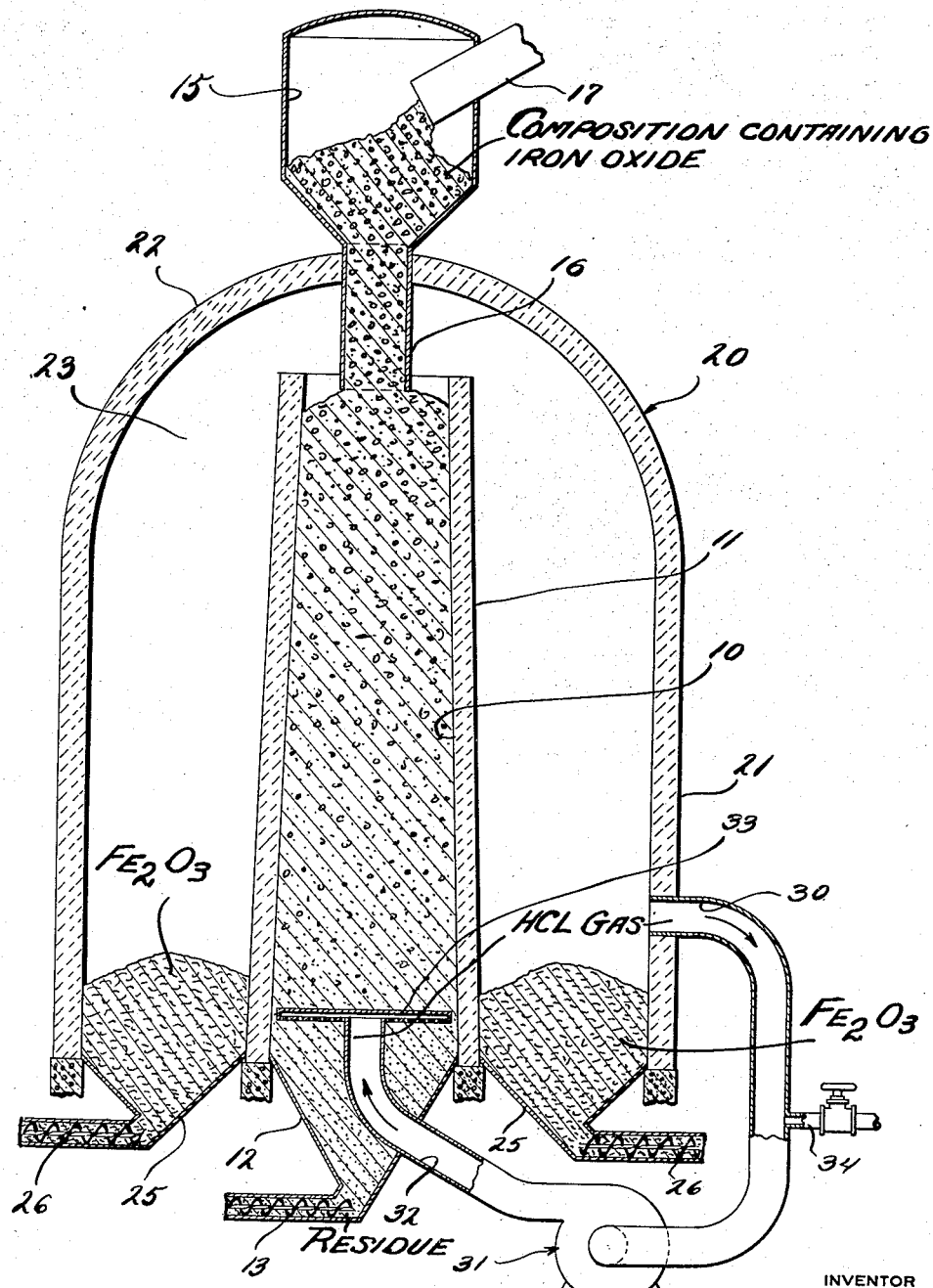

2,176,242

UNITED STATES PATENT OFFICE 2,176,242

PRODUCTION OF FERRIC OXIDE

Urban E. Bowes, Perrysburg, Ohio

Application June 26, 1934, Serial No. 732,488
Renewed April 20, 1938

5 Claims. (Cl. 23—200)

This invention relates to the art of metallurgy and has particular reference to a method for removing a metal from its ores or mixtures in which it is contained, the metal being obtained either in a pure state or in a form in which it may be commercially used.

One of the primary objects of this invention is to provide a method of the above mentioned character which will produce the metal or the desired compound thereof in a form possessing a high degree of purity.

A further object of this invention is to provide a method of the above mentioned character which may be carried out at temperatures lower than those temperatures generally heretofore required for the recovery of metals and their compounds.

Still further, the invention has as an object to provide a method which will eliminate the use of expensive re-agents which become lost or consumed during the process and to thus provide a method or process which may be economically carried out on a commercial scale.

Numerous other objects and advantages of the invention will become apparent as the following description proceeds.

For the purpose of clearly presenting the invention, the same will be described as being embodied in a process for removing iron from ores or mixtures in which it is contained, but it is to be understood that the invention is not limited to the recovery of iron alone but may be utilized in the recovery or obtaining of other metals and their compounds.

The usual method of recovering iron from iron ore is by the blast furnace, which has two main functions. One function of the blast furnace is to cause a reduction of the iron oxide to free iron by allowing fixed carbon and carbon monoxide to combine with the oxygen of the iron oxide. The second main function of the blast furnace is to separate the iron from the non-ferrous portion of the ore, chiefly silica but also lesser amounts of other impurities, by adding lime which reacts with silica and alumina to form a glass or slag which is less dense than iron and will float on the molten iron. Since the iron is in a molten state during the process, the separation is not complete for the reason that carbon and certain other impurities generally present in the ore are soluble in the molten iron to some degree.

While the reduction of iron oxide to free iron can be accomplished at a relatively low heat, approximately 1200 to 1400° F., the separation of the iron from the non-ferrous portions of the ore cannot be accomplished at this low temperature, with the result that the blast furnace which performs both functions or steps of the process is used practically universally. The use of blast furnaces however, has certain fundamental disadvantages, chief among which are the following:

First, excessively high temperatures are required to fuse the slag-forming materials at a desirable rate, the temperatures ordinarily used being above 2800° F. even though the reduction of the iron oxide could be accomplished at a temperature between 1200 to 1400° F. This high temperature requires the use of coke which is a relatively expensive form of fuel as compared to coal, which could be utilized for reduction of the iron oxide at a red heat.

Further, the efficiency of the blast furnace decreases rapidly with the decrease of iron content in the ore or the mixture being treated because of the great increase of heat required to slag the additional silica. Thus the blast furnace is not really suited for the processing of low grade ores.

Further, as brought out before, carbon and certain other impurities dissolve in the molten iron and most of these impurities must later be removed in the making of steel. In practice it is found that approximately 4% of the carbon from the coke which is utilized dissolves in the molten iron.

A still further disadvantage of the blast furnace is that in this process limestone must be used for forming the slag and this limestone constitutes a substantial item of cost in the process.

The present invention contemplates the elimination of the above mentioned disadvantages and the provision of a practical method which may be continuously and economically performed. In its broader aspects the method consists in treating ore containing iron with a re-agent which reacts with the iron to convert the same to a gas, and to form an accompanying gas, separating this gasified iron and the accompanying gas from the ore, and reversing the reaction which occurred during the initial conversion of the iron to a gas to convert the gasified iron to a solid form and to recover the re-agent utilized in the original conversion. Thus the method broadly consists in subjecting the iron while in a gaseous state to reversible reactions, the product thus produced being a pure iron oxide which may be subsequently reduced at a red heat to obtain iron of a high degree of purity which is not contaminated with the impurities ordinarily taken up by the molten iron in blast furnace practice.

More specifically the method consists in first preheating the iron ore or mixture to be treated to a suitable temperature, approximately 1800 to 2000° F. This can be done cheaply and the temperature may be kept sufficiently low that the iron is not converted into a molten condition.

The next step in the process consists in effecting a contact of a gaseous re-agent with the heated ore to convert the iron to a gaseous state and to produce an accompanying gas. This is effected in an atmosphere free from air, and a gasifying re-agent is utilized which is a gas at or above the temperatures employed at atmospheric pressure. An example of such a re-agent is hydrogen chloride. It is important that the re-agent utilized be such that it will combine with the iron but will not combine with the non-ferrous portion of the ore.

The gasified iron compound is then separated from the residue of the ore and after its separation is subjected to a somewhat lower temperature approximately 1200 to 1600° F. This causes the gaseous iron compound and the accompanying gas to react forming crystals of ferric oxide and causing the hydrogen chloride to return to its original form so that this re-agent may be recovered and again utilized.

The several reactions which take place in the process as thus far described are probably illustrated by the following equations.

(1)  $Fe_2O_3 + 6HCl = 2FeCl_3 + 3H_2O$ 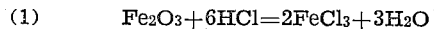
(2)  $3H_2O + 2FeCl_3 = 6HCl + Fe_2O_3$ 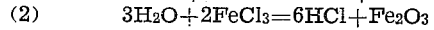

The first equation indicates the reaction which takes place when the iron oxide in the ore is converted into a gas. The hydrogen chloride which is a gas at and above atmospheric temperatures contacts with the iron oxide in the ore with the result that ferric chloride and water are formed as indicated by the equation. The ferric chloride volatilizes above 575° F. so that the iron in gaseous form is separated from the silica and other impurities in the ore. The water which is formed during this reaction travels with the ferric chloride in the form of steam in view of the temperature at which this reaction is effected.

The steam and ferric chloride both being gases or vapors are, as brought out before, separated from the residue of the ore and these gases or vapors are then subjected to the lower temperature preferably from 1200 to 1600° F. at which time the reaction indicated as Equation 2 above takes place. By reference to this equation it will be noted that the hydrogen chloride returns to its original form so that it may be suitably recovered for further use while the iron oxide in a pure state crystallizes and may be separated from the gaseous hydrogen chloride. The reversing reaction by which the iron chloride changes to a crystalline iron oxide may occur at various temperatures preferably between those above mentioned depending upon time and equilibrium factors.

The iron oxide as thus obtained is substantially pure and the process may be terminated at this point, the iron oxide being disposed of commercially for whatever purposes it is desired to use the same. If, however, pure iron is desired, the pure iron oxide which has been obtained may be readily reduced at a red heat in any desired manner, as for example, by the use of carbon. It will be apparent that this reduction of the iron oxide to pure iron may be accomplished without the use of expensive fuel and that in view of the fact that the iron is not converted into a molten condition during this reducing operation there is no danger that carbon or other impurities will be combined with or dissolved in the iron.

While numerous types of apparatus might be utilized for carrying out the above process, there is diagrammatically illustrated in the single figure of the drawing one form of apparatus which may be readily utilized.

Referring then to the drawing, the numeral 10 designates generally a chamber adapted to receive the ore to be treated. It is in this chamber that the primary reaction takes place in that the gasifying reagent is forced upwardly through the ore in chamber 10, converting the iron to ferric chloride and leaving the non-metallic portion of the ore in the chamber. The chamber 10 is defined by the side walls 11 and terminates at its lower end in a hopper 12 into which the gangue or non-metallic portions of the ore falls. A closed screw conveyor 13 communicates with the lower end of the hopper 12 for removing the non-metallic portion of the ore from the hopper.

For feeding the ore to be treated to the chamber 10 there is provided a closed hopper 15, the discharge end 16 of which projects slightly within the open upper end of the chamber 10. Ore which has been previously heated in a rotary kiln or by some other external heating device is fed into the hopper 15 by conduit 17, the hopper 15 being kept partly full of the ore to prevent the escape of gas from the retort 20.

The retort 20 comprises the side walls 21, which merge into a top wall snugly embracing the discharge end 16 of the hopper 15 as illustrated. The retort thus provides a chamber 23 which surrounds the chamber 10 and which communicates at its upper end with the upper end of chamber 10. The chamber 23 defines the zone of reverse reaction in which the crystals are deposited from the reaction of the gases leaving chamber 10.

The floor of the retort is provided with hoppers 25 and each hopper is provided with a closed screw conveyor 26 by which the crystals which collect in the hoppers 25 may be removed. The walls 21 and 22 of the retort are formed of a refractory material and the inner surfaces of these walls are salt-glazed while the exterior surfaces are suitably covered to be impervious to the penetration of gases.

Tapped into the retort is a conduit 30 which communicates with a blower or fan 31 which functions to withdraw gas from the retort and to discharge the same into the lower end of chamber 10 by means of a suitable conduit 32. The conduit 32 is provided on its end with a suitably shaped nozzle 33 to aid in properly distributing the gasifying re-agent across the lower end of chamber 10. A valve controlled conduit 34 may, if desired, be tapped into the conduit 30 for supplying additional quantities of the gaseous re-agent to the system when necessary.

In carrying out the process with the apparatus illustrated and assuming that the chambers 10 and 23 and the hopper 15 are all empty, the first step is to remove the air from these chambers and the hopper. This may be conveniently accomplished by actuating the blower 31 sufficiently to remove the air from the blower and by admitting hydrogen chloride to the system by means of conduit 34. The hydrogen chloride being heavier than air will settle to the bottom of the chambers 10 and 23 causing the air to escape through the hopper 15 and conduit 17. After all of the air has been exhausted the valve in conduit 34 is closed so that the chambers 10 and 23 and the hopper 15 are all filled with hydrogen chloride at substantially atmospheric pressure.

The iron ore or other mixture containing iron is then preheated in any desired manner to a temperature between 1600 and 2000° F. and is fed into the hopper 15 by way of conduit 17. The heated ore falls from the hopper 15 through the discharge 16 into the chamber 10 filling the latter as indicated. The fan 31 may then be started causing the gasifying re-agent to be withdrawn from chamber 23 and forced upwardly through the ore in chamber 10.

As brought out before the chamber 10 defines the primary reaction zone while the chamber 23 defines the zone of reverse reaction in which crystals are deposited from the reaction of gases. Thus in the chamber 10 the gaseous re-agent is forced upwardly through the iron ore and combines with the iron to form gaseous ferric chloride and steam. These two gases flow out the open upper end of chamber 10 leaving the nonferrous portion of the ore which includes silica and other impurities, remaining in chamber 10 to be withdrawn therefrom by conveyor 13. It might be noted that by feeding the hot ore into the top of chamber 10 and the re-agent into the bottom of this chamber, a very efficient conversion of the iron oxide of the ore to ferric chloride may be effected because the ore is hottest at the point of exit of the gases from the chamber 15. The chamber 23 is at a temperature lower than the chamber 10, the temperature maintained in chamber 23 being between 1200 and 1600° F. As the steam and the gaseous ferric chloride therefore reach chamber 23 the reverse of the chemical reaction takes place producing pure ferric oxide and the original hydrogen chloride. The pure crystals of ferric oxide (haematite) fall into the hoppers 25 and are withdrawn from these hoppers by the conveyors 26 while the gasifying re-agent is withdrawn from the chamber 23 by conduit 30 and is recirculated through the chamber 10.

It is preferable to maintain the pressure within the chambers 10 and 23 substantially the same as that of the atmosphere to thus reduce the possibility of air entering these chambers or the gasifying re-agent from escaping from these chambers. To further guard against the admission of air into or the escape of the re-agent from the chambers 10 and 23, the hoppers 12, 15 and 25 are all kept partly full as indicated.

To facilitate the reversible reactions previously described, it is preferable that there be no excess of hydrogen chloride within the chamber 23. Thus the hydrogen chloride should be fed upwardly through chamber 10 at only such a rate as to permit all of the hydrogen chloride gas to be converted to ferric chloride gas. Approximately 1000 cubic feet of gas fed into chamber 10 for approximately every eighty pounds of ore containing approximately 50% iron fed into the chamber should give the desired results.

The pure iron crystals as thus obtained may, as brought out before, be distributed commercially or may be further subjected to reduction at red head to obtain iron of a high degree of purity. By virtue of the fact that this reducing operation may be effected without melting the iron, all danger of carbon or other impurities being dissolved in the iron is eliminated so that extremely pure iron may be obtained.

From the above it will be apparent that the invention provides a method by which pure iron or iron oxide may be conveniently and efficiently recovered from iron ores or other mixtures containing iron by a reversible reaction in gaseous state. The recovery of the iron or iron oxide may be effected at relatively low temperatures thus eliminating the necessity of utilizing coke which is relatively expensive as compared to coal. Further, the recovery may be effected without utilizing limestone which is also relatively expensive and which is necessary for use in the blast furnace process. The process may be continuously carried out and since the temperatures utilized during the entire process are below the melting point of iron oxide, there is no danger of carbon or other impurities being dissolved in the iron thus providing for the production of iron or iron oxide of a high degree of purity.

While the invention has been described with some detail, it is to be understood that the description is for the purposes of illustration only and is not definitive of the limits of the inventive idea. The right is reserved to make such changes in the steps of the method and in the type of apparatus used as will fall within the purview of the attached claims.

What I claim as my invention is:

1. In a method of obtaining ferric oxide from a composition in which it is contained, those steps which consist of flowing hydrogen chloride through a mass of the composition at a temperature above the temperature at which ferric chloride volatilizes, to produce a gaseous mixture of ferric chloride and steam, separating the said gaseous mixture from said composition, lowering the temperature of the said mixture to reverse the original reaction a substantial degree and produce hydrogen chloride and ferric oxide, and so limiting the amount of hydrogen chloride in proportion to the gaseous ferric chloride formed that after separating the gaseous ferric chloride and steam from the mass a substantial degree of reversal of the original reaction is effected on the lowering of the temperature of the mixture of ferric chloride and steam.

2. In a method of obtaining continuously ferric oxide from a composition in which it is contained, those steps which consist of flowing hydrogen chloride through a mass of the composition at a temperature above the temperature at which ferric chloride volatilizes, to produce a gaseous mixture of ferric chloride and steam, separating the said gaseous mixture from said composition, lowering the temperature of the said mixture to reverse the original reaction a substantial degree and produce hydrogen chloride and ferric oxide, so limiting the amount of hydrogen chloride in proportion to the gaseous ferric chloride formed that after separating the gaseous ferric chloride and steam from the mass, a substantial degree of reversal of the original reaction is effected on the lowering of the temperature of the mixture of ferric chloride and steam, and recirculating the hydrogen chloride formed by the said reversal back into said mass for the treatment of further amounts of the composition.

3. In a method of obtaining ferric oxide from a composition in which it is contained, those steps which consist in heating the composition to a temperature below the melting point of ferric oxide but above the temperature at which ferric chloride volatilizes, effecting a contact of hydrogen chloride gas with the heated composition to produce a gaseous mixture of ferric chloride and steam, separating the gaseous mixture from said composition, lowering the temperature of the gaseous ferric chloride and steam to a temperature above the temperature at which ferric chloride condenses, so limiting the hydrogen chloride gas utilized in proportion to the gaseous ferric chloride formed that after separating the ferric chloride and steam from the composition, a substantial degree of reversal of the original reaction is effected upon the lowering of the temperature of the mixture of ferric chloride and steam, and maintaining the mixture of gaseous ferric chloride and steam at the said lowered temperature until a substantial portion of the ferric chloride has been reconverted to ferric oxide by a reversal of the original reaction.

4. In a method of obtaining ferric oxide from a composition in which it is contained, those steps which consist in heating the composition to a temperature below the melting point of ferric oxide but above the temperature at which ferric chloride volatilizes, effecting a contact of hydrogen chloride gas with the heated composition to produce a gaseous mixture of ferric chloride and steam, separating the gaseous mixture from said composition, lowering the temperature of the gaseous ferric chloride and steam to a temperature above the temperature at which ferric chloride condenses, so limiting the hydrogen chloride gas utilized in proportion to the gaseous ferric chloride formed that after separating the ferric chloride and steam from the composition, a substantial degree of reversal of the original reaction is effected upon the lowering of the temperature of the mixture of ferric chloride and steam, maintaining the mixture of gaseous ferric chloride and steam at the said lowered temperature until a substantial portion of the ferric chloride has been reconverted to ferric oxide by a reversal of the original reaction, and recirculating the hydrogen chloride formed by the said reversal back into said mass for the treatment of further amounts of the composition.

5. The method of continuously separating ferric oxide from its ore including a gangue material which comprises establishing a mass of said ore, heating said mass to a temperature above the temperature at which ferric chloride volatilizes and below the melting point of ferric oxide, continuously passing hydrogen chloride gas through and in contact with said mass to produce a gaseous mixture of ferric chloride and steam, continuously removing said gaseous mixture from said mass, lowering the temperature of said gaseous mixture to a point not lower than the volatilization temperature of ferric chloride and causing a reversal of the original reaction and production of solid ferric oxide and gaseous hydrogen chloride, recovering said ferric oxide, and recirculating said hydrogen chloride back into said mass for the treatment of further amounts thereof.

URBAN E. BOWES.